Oct. 3, 1933.   R. E. CROSSLEY   1,929,016
REVOLVING BEACON CLUTCH MECHANISM
Filed July 3, 1929   3 Sheets-Sheet 2
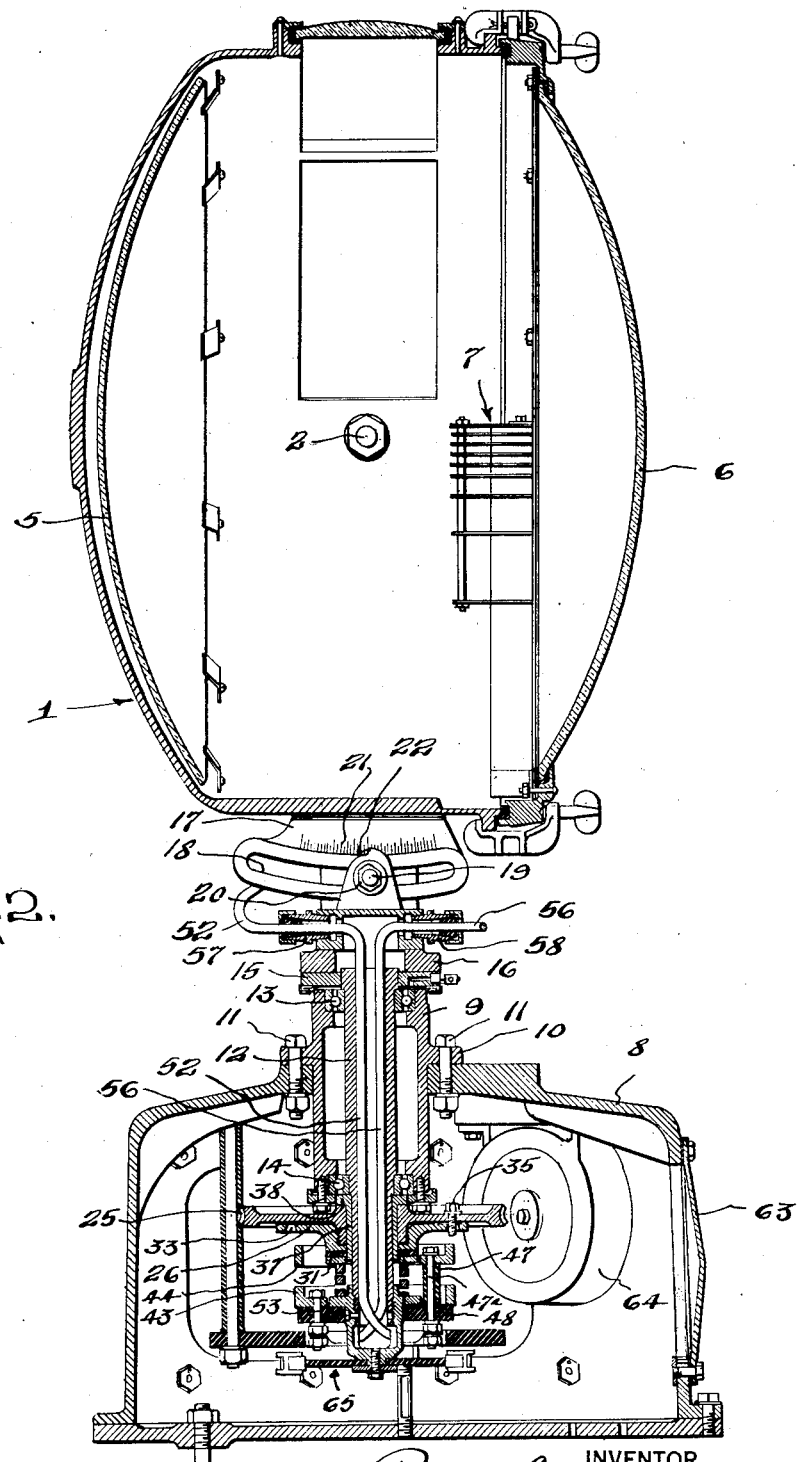

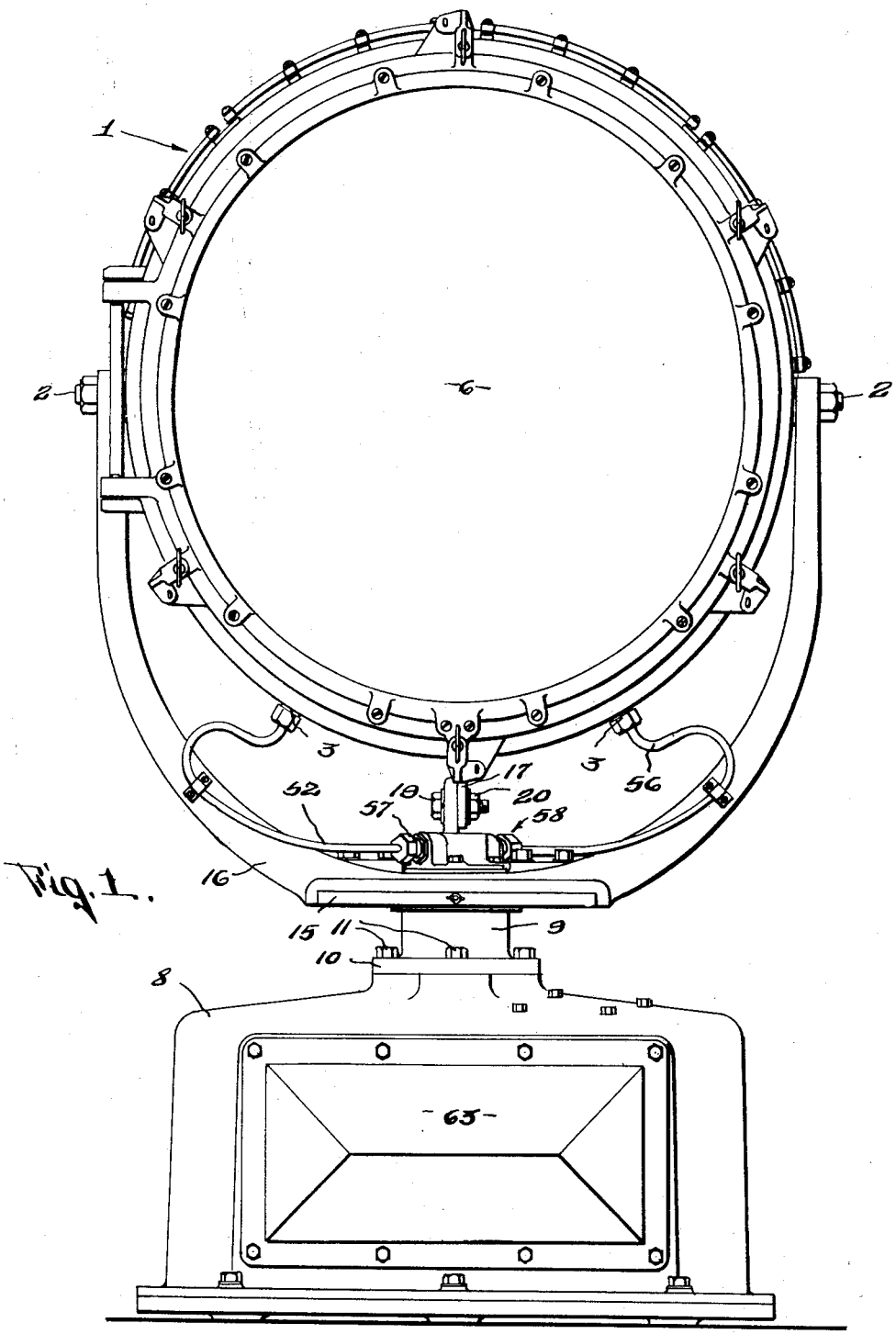

Oct. 3, 1933.  R. E. CROSSLEY  1,929,016
REVOLVING BEACON CLUTCH MECHANISM
Filed July 3, 1929   3 Sheets-Sheet 3
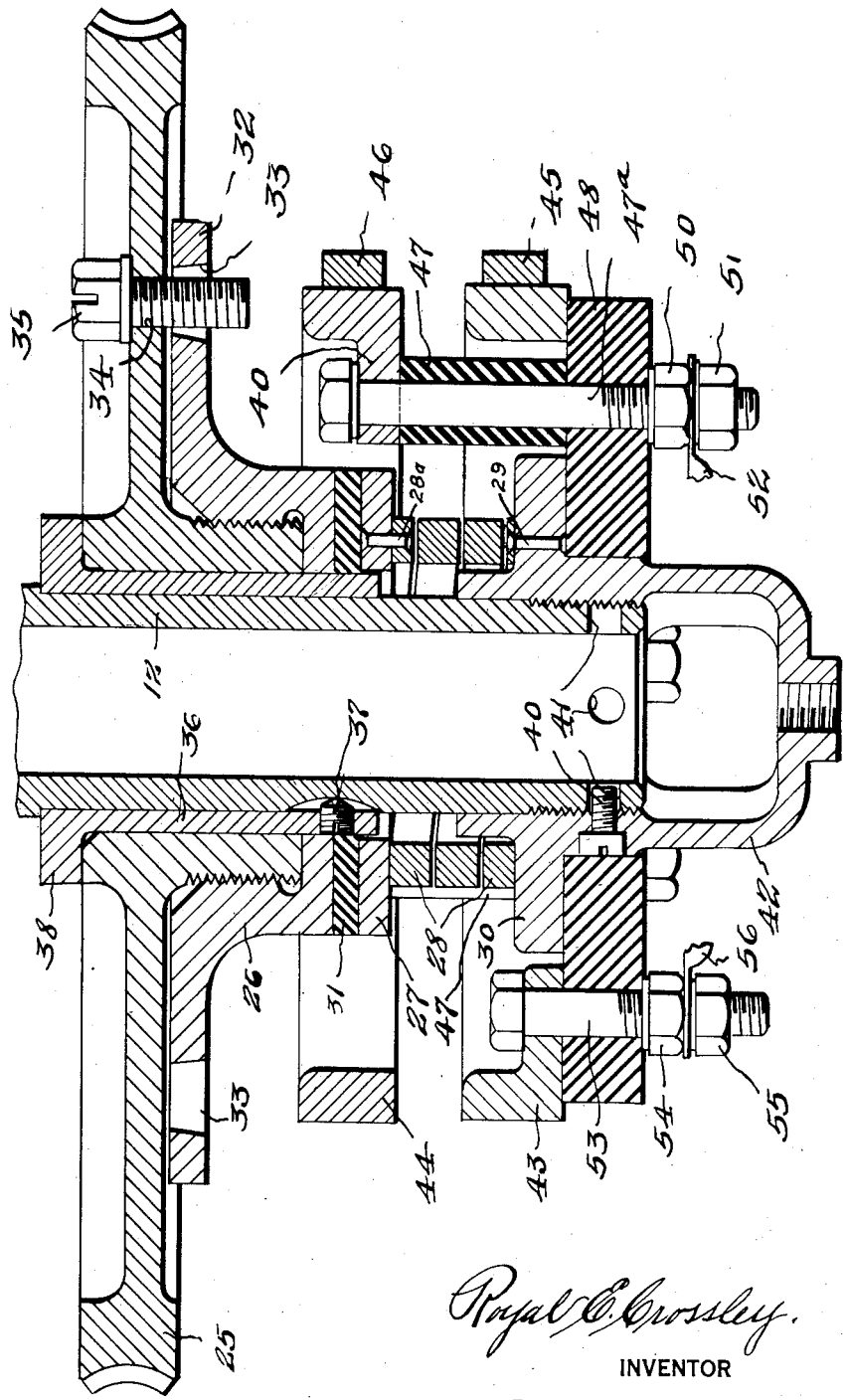

Patented Oct. 3, 1933

1,929,016

UNITED STATES PATENT OFFICE 1,929,016

REVOLVING BEACON CLUTCH MECHANISM

Royal E. Crossley, Syracuse, N. Y., assignor to Crouse-Hinds Company, Syracuse, N. Y., a corporation of New York Application July 3, 1929. Serial No. 375,833

5 Claims. (Cl. 177—352)

This invention relates to revolving beacons and has for its object a particularly simple, efficient, compact and readily adjustable clutch and driving mechanism for rotating the beacon.

The invention consists in the novel features and in the combinations and constructions hereinafter set forth and claimed.

In describing this invention, reference is had to the accompanying drawings in which like characters designate corresponding parts in all the views.

Figure 1 is a front elevation of a beacon embodying this invention.

Figure 2 is a vertical, sectional view through a beacon and its driving mechanism.

Figure 3 is an enlarged, fragmentary, sectional view of the driving mechanism, and contiguous parts.

1 designates the beacon, generally, which may be of any suitable form, size and construction. The beacon has any suitable lamp, or lamp mechanism therein.

5 is a reflector.

6 is the lens.

7 designates a series of deflectors for horizontaling the light rays, these being located near the lamp.

8 is a casing or housing in which the mechanism for revolving the beacon is mounted and above which the beacon is mounted, the casing constituting the base of the beacon.

9 designates a support, detachably mounted in the top of the casing, the support being generally tubular in form and having an annular flange 10 which laps the top face of the case 8 and which is secured thereto as by bolts 11. The support 9 extends above the top of the housing 8 and also depends into the housing.

12 is a hollow, rotating spindle mounted in the support 9 and having journal and thrust bearings therein.

13 and 14 designate the journal and thrust bearings and they are here shown, as anti-friction, or ball bearings. The beacon 1 is supported on the upper end of the spindle and as here illustrated, the spindle is provided with a head 15 at its upper end overlying the upper end of the support 9 and on this head 15 is mounted, a yoke or fork 16 which carries the beacon. As here illustrated, the beacon is provided with a bracket 17 on its lower side formed with an arc shaped slot 18 mounted adjacent bracket arms on the yoke 16 and clamped thereto as by a bolt 19 having a nut 20 thereon. The beacon is adjustable fore and aft about its pivot 2 to direct the beam thereof, and in order that the angle of adjustment may be determined, a scale 21 is provided on the bracket 17 along the slot. The bracket arm on the yoke is formed with a pointer or gage line 22. By loosening the nut 20, the beacon may be tilted fore and aft to any desired degree and then clamped in its adjusted position by the nut 20.

The spindle 12 extends below the support into the bottom of the casing and is provided with mechanism for driving or rotating the spindle 12, and also means for conducting the current from the service wires to the lamp of the beacon which is mounted concentrically on the lower end portion of the spindle 12. The construction thus far described, forms no part of this invention.

The actuating mechanism comprises a driving member as a worm gear 25, a driving friction clutch section 26 associated with the driving member or gear and adjustable axially relatively thereto, a driven friction clutch section 27, a spring 28 tending to press the driven clutch section against the driving clutch section, and a spring abutment 30 mounted on the lower end of the spindle 12. A ring 31 of friction material is interposed between the clutch sections. The driving clutch section is adjustably mounted on the hub of the driving gear 25 and as here shown, threads thereon and is formed with an annular flange 32 lapping, or opposed to the web of the driving gear 25. Means is provided for locking the driving gear 25 and the driving clutch section 26 in any one of a number of adjusted positions. As here shown, the flange 32 is provided with a series of holes 33 movable into alinement with a hole 34 in the web of the wheel 25 and a screw 35 threads through the hole 34 into any one of the holes 33 in alinement therewith. The adjustable clutch constitutes the principal subject matter of the invention.

The driven clutch section 27 is secured to the clutch spring 28, as shown by the rivets 28ᵃ. The opposite end of the clutch spring 28 is secured to the abutment 30 by means of rivets at 29. The clutch spring may be secured to the abutment 30 in any satisfactory manner, as can also the driven clutch section 27. It is to be noted in my construction, that the power is transmitted from the driven clutch section to the rotatable spindle, through the clutch spring 28. This feature adds materially in the operation of the beacon. If, in some manner, the beacon should become stalled, an excessive load on the clutch spring 28 will cause it to compress axially, thereby drawing the driven clutch section 27 slightly away from the driving clutch section 26. This causes a slippage between the sections with a smaller loss of friction than would occur in clutches of general construction, where the clutch spring simply holds the clutch sections into engagement.

The worm gear 25 is mounted upon a bushing 36 around the spindle 12, this bushing being keyed at 37 to the spindle 12 and having an annular flange 38 at its upper end which thrusts upward against the support 9, or the bearing 14, so that the gear 25 is held against upward movement. Accordingly, the spindle 12 and the rotating mechanism thereon can not be withdrawn from the base housing 8 and has no upward movement, except that allowed by the compression of the clutch spring 28. This feature of construction and assembly of parts is very important as the beacons are mounted on high poles or steel towers and are hoisted into position by securing a rope or cable around the beacon support, between the beacon proper and the base. The construction permits this convenient mode of handling the beacon without the danger of injuring the parts by pulling it apart.

As it is not desirable to use shims between a motor and its support, the worm on the motor shaft is easily and forcibly lined up with the worm wheel 25 by placing shims between the flange 38 of the bushing 36 and the lower end of the support 9 and thrust bearing 14. This shimming is necessary to take care of manufacturing variations in machining the various surfaces between the motor and the spindle 12.

It is to be noted that, as the bushing 36 is keyed to the spindle 12, the pressure between the clutch members is confined to the clutch mechanism, that is, the worm 25 is thrust against the flange 38 of the bushing, which normally rotates with the spindle, and no friction is produced by the clutch spring between the flange and the support 9 or bearing 14.

Upon removal of the adjusting screw 35 and turning of the driving clutch section 26, the driving clutch section will be moved axially relatively to the gear 25 and also, of the spindle 12 and tightens or loosens the clutch. The spring 28 is anchored at its ends to the driven clutch section 27 and to the abutment 30. The abutment 30 threads on the lower end of the spindle 12 and is locked from turning movement by a set screw 40 which enters any one of a plurality of holes 41 in the spindle. The abutment also has a head 42 located below the end of the spindle and being open at its sides for permitting the passage of wires into the lower end of the spindle 12.

The means for conducting the current from the service wires to the revolving beacon comprises, annular conductors 43, 44 mounted concentric with the spindle and supported one above the other on the abutment 30, brushes 45, 46 coacting with said conductors and connected in the feed circuit and connections between the annular conductors and the lamp terminals, said conductors extending through the hollow spindle 12.

The annular conductor 43 is mounted on spacers 47 interposed between it and the base 48 of insulation carried by the abutment 30. A terminal screw 47a extends through an internal lug 40 on the ring 44 through one of the spacers 47 and the base 48 of insulation and is provided with binding nuts 50 and 51 at its lower end, between which one end of the terminal of a wire 52 is connected. The other ring 43 overlies the base 48 and is secured thereto by a terminal screw 53 having binding nuts 54, 55 at its lower end between which the terminal of the wire 56 is clamped. There are a plurality of spacers 47 and screws or bolts 47a, but only one serves as a binding screw.

The brushes 45, 46 are mounted in any suitable manner. The wires 52, 56 extend upwardly through the spindle 12 and laterally out through weather tight bushings 57 and 58 in the yoke 16 and lead through bushings 3 in the beacon case to the lamp within the beacon.

The case 8 is provided with a removable door 63 on one side thereof, which when removed exposes the clutch and other mechanisms on the lower end of the spindle 12, so that the clutch can be readily adjusted, that is, the adjusting screw 35 can be readily removed and the driving clutch member 26 can be readily adjusted by means of a spanner wrench coacting with the holes 33. Also, the brushes 45, 46 and wire terminals 47a, 53 are readily accessible. The worm wheel 25 is driven from an electric motor 64 located in the casing, the shaft of which is connected to a worm, not shown, meshing with the worm wheel 25.

65 designates a cam mechanism mounted on the lower end of the spindle and rotatable therewith, this cam mechanism acting to flash or make and break contact through a lamp or lamps for flashing Morse code signals, or other signals identifying the station at which the beacon is located. This flashing mechanism forms no part of this invention, except its location at the lower end of the spindle.

Owing to the relative arrangement of the support 9, spindle 12, the driving mechanism, the clutch adjusting means and the mounting of the support 9 in a casing having a door in the side thereof, all the mechanism having to do with the operation of the beacon is readily accessible.

In these beacons which are particularly adapted for air ports, the clutch mechanism must be accurately adjusted up to a point where it will resist a predetermined amount of resistance tending to hold the beacon from turning and the clutch must slip when the beacon is subject to greater predetermined resistance.

Owing to the relative location of the clutch and its mounting, it is readily accessible for adjustment to suit the required conditions.

What I claim is:

1. In a driving mechanism for revolving beacons, the combination of a base member forming a closure for the driving elements, a vertical supporting member secured to the top of the base member and depending therein, a hollow spindle for supporting the beacon proper journalled in the supporting member and extending through the same into the base member, a driving member mounted concentric with the spindle and abutting against the lower end of the supporting member, a driving friction clutch section mounted on the driving member concentric with the spindle, the driving member and the driving clutch section having coacting means whereby the clutch section is adjustable in axial direction with respect to the driving member, and means for securing the clutch section rigidly to the driving member in various adjusted positions, an abutment fixed on the lower end of the spindle and rotatable therewith, a driven friction clutch section arranged concentric with the spindle, a spring interposed between the driven clutch section and the abutment, one end of the spring being secured to the driven clutch section, and the other end to the abutment, and means for actuating the driving member.

2. In a driving mechanism for revolving beacons, the combination of a base member forming a closure for the driving elements, a vertical support carried by the base member and depending therein, a hollow spindle journalled in the supporting member being held from axial movement relative to the same, the spindle having means on its upper end for supporting the beacon proper, and its lower end extending beyond the lower end of the supporting member, a driving member mounted concentric with the spindle, a driving friction clutch section carried by the driving member, means carried by the driving member and operable to adjust the clutch section axially relative to the driving member, an abutment fixed to the lower end of the spindle, a driven friction clutch section mounted concentric with the spindle coacting with the driving clutch section, a spring interposed between the abutment and the driven clutch section for normally holding the same in engagement with the driving clutch section, the ends of the springs being secured to the abutment and the driven clutch section respectively, means securing the driving member from axial movement relative to the spindle, and means for securing the driving clutch section rigidly to the driving member in any adjusted position.

3. In a driving mechanism for revolving beacons, the combination of a base member forming a closure for the driving elements, a vertical support mounted in the base member, an upright hollow spindle journalled in the supporting member and being held from axial movement relative thereto, means connected to the upper end of the spindle for carrying the beacon proper, and means mounted on the lower end of the spindle for rotating the same, the last mentioned means including a driving member abutting against the lower end of the supporting member and being provided with a friction clutch section, means operable to adjust the clutch section axially relative to the driving member, means for rigidly securing the clutch section to the driving member in any adjusted position, an abutment fixed on the lower end of the spindle and rotatable therewith, a driven friction clutch section mounted concentric with the spindle and in juxtaposition with the driving clutch section, and spring means mounted between the abutment and the driven clutch section having its ends secured to said elements respectively, and means for rotating the driving member.

4. In a driving mechanism for revolving beacons and the like, the combination of a base in the form of a box, a supporting member secured to the top of the base and depending therein, a spindle journalled in the supporting member and extending beyond the lower end thereof, said spindle being held from axial movement relative to the supporting member, a driving member rotatably mounted on the spindle beyond the supporting member and abutting against the same, a driven member fixed on the spindle and being spaced apart from the driving member, a friction clutch section mounted concentric with the spindle between the driving and driven members, a spring interposed between one of said members and the clutch section, the ends of the spring being secured to the clutch section and one of said members respectively, means coacting with the driving member for adjusting the clutch section toward and from the driven member for tensioning the spring.

5. In a driving mechanism for revolving beacons and the like, the combination of a base forming a closure, a supporting member secured to and depending in said base, a spindle for supporting the beacon proper journalled in said supporting member, means for securing said spindle from axial movement relative to the supporting member, a driving member mounted within the base concentric with the spindle and having a depending externally threaded hub portion, a clutch member having a bore threading upon the hub of the driving member, means for securing the driving member and the clutch member against relative rotative movement in one of a plurality of positions with respect to each other, an abutment secured to the lower end of the spindle, a spring interposed between the driving clutch member and said abutment, one end of said spring being secured to the clutch member and the opposite end to the abutment, and means for actuating the driving member.

ROYAL E. CROSSLEY.